(12) United States Patent
Reid

(10) Patent No.: US 9,684,496 B1
(45) Date of Patent: Jun. 20, 2017

(54) METHOD FOR PARSING PROGRAMMING LANGUAGES AND STRUCTURED DATA

(71) Applicant: Norman L. Reid, San Francisco, CA (US)

(72) Inventor: Norman L. Reid, San Francisco, CA (US)

( * ) Notice: Subject to any disclaimer, the term of this patent is extended or adjusted under 35 U.S.C. 154(b) by 0 days.

(21) Appl. No.: 15/081,169

(22) Filed: Mar. 25, 2016

(51) Int. Cl.
*G06F 9/45* (2006.01)

(52) U.S. Cl.
CPC .............. *G06F 8/427* (2013.01); *G06F 8/425* (2013.01)

(58) Field of Classification Search
CPC . G06F 8/427; G06F 8/425; G06F 8/75; G06F 17/21; G06F 17/27
See application file for complete search history.

(56) References Cited

U.S. PATENT DOCUMENTS

| 6,968,395 | B1 * | 11/2005 | Lee | H04L 69/22 709/246 |
| 7,093,231 | B2 * | 8/2006 | Nuss | G06F 8/31 707/999.006 |
| 8,145,474 | B1 * | 3/2012 | Daily | G06F 11/2257 704/10 |
| 2004/0172234 | A1 * | 9/2004 | Dapp | G06F 8/427 704/1 |
| 2009/0024385 | A1 * | 1/2009 | Hirsch | G06F 17/2785 704/9 |
| 2015/0142443 | A1 * | 5/2015 | Hwang | G06F 17/27 704/257 |

* cited by examiner

*Primary Examiner* — Lewis A Bullock, Jr.
*Assistant Examiner* — Jacob Dascomb

(57) ABSTRACT

A computer implemented method for parsing computer languages and structured data which converts the source language text of a computer program, e.g. C or FORTRAN, or structured data, e.g. HTML or XML, into a syntax tree. The method has two steps. The first step looks for sequences of tokens in the main token list in which no tokens referring to recursive delimiters exist. The second step parses those tokens into a partial syntax tree which is inserted back into the main token list replacing the tokens which have just been parsed. The two steps are repeated until only one token remains in the main token list. Because no recursion exists in the tokens being parsed by the second step, a find and replacement mechanism using regular expressions can be used to do the parsing. Guidelines are shown for creating a language definition using regular expressions.

20 Claims, 14 Drawing Sheets

Recursive Delimiter Table

| opening delimiter | closing delimiter | pass delimiters | error substitution | name |
|---|---|---|---|---|
| ( | ) | no | E | matching pair |
| if | | yes | S | opening only |
| | ; | yes | S | closing only |

Pseudo code implementation of 1st embodiment of step 1

```
1  loop1: For each token:
2  if no more tokens
3      go to final processing
4  add token to linked list of tokens [the main token list]
5  if token is opening recursive delimiter
6      mark it as unprocessed
7  if token is not closing delimiter
8      continue loop1
9
10 closingToken = current token
11 loop2: for each token backwards from closingToken
12     if token is opening recursive delimiter AND token is mark as unprocessed
13         openingToken = token
14     else continue loop 2
15     if openToken is openOnly [case 1]
16         mark openingToken as processed.
17         do process tokens (from openToken up to but not including closingToken)
18         continue loop2
19     if openingToken and closingToken are both matching pair delimiters[case 2]
20         if openingToken and closingToken are not part of the same matching pair
21             if closingToken is also an openingToken
22                 mark closingToken as unprocessed opening token
23                 exit loop2
24             else
25                 either exit loop2 or go to line 27 or 31.
26
27         mark both tokens as processed.
28
29         do process tokens (from openingToken to closingToken)
30         exit loop2
31     if closingToken is closing only [case 3]
32         mark closingToken as processed.
33         do process tokens (from token AFTER openingToken up to and including
                                                                  closingToken)
34         exit loop2
35
36     if beginning of main token list is found [case 4]
37         mark closingToken as processed.
38         do process tokens (from token first token up to and including closingToken)
39         exit loop 2
40     end loop2
41 continue loop1
42 end loop1
```

Figure 3a

Figure 3 continued 43 final processing:

44    loop3: for each token backwards from last token
45       if no more tokens
46          exit loop3
47       if token is openingToken
48          mark openingToken as processed
49          do process tokens (from openingToken up to last token in the main token list 50       continue loop3
51    end loop3

52 do process tokens (from first token through last token in the main token list)

Figure 3b

Pseudo code for process Tokens 1    receive a list of tokens from Step1
2    if delimiters are not to be passed to Step 2
3       remove delimiters from received token list
4    pass selected tokens to Step2
5    replace the tokens passed to Step 2, with the result of Step 2 in the main token list.
6    return the token returned by Step2.

Figure 4

Pseudo code implementation of 2nd embodiment of step 1

```
1  loop1: For each token:
2    if no more tokens
3        go to final processing
4    add token to linked list of tokens [the main token list]
5    if token is opening recursive delimiter
6        push token on open token stack
7    if token is not closing recursive delimiter
8        continue loop1
9
10   closingToken = current token
11   loop2: openingToken = token on top of open token stack
12
13
14
15       if openingToken is openOnly [case 1]
16           pop token on open token stack
17           do process tokens (from opening Token up to but not including closingToken)
18           continue loop2
19       if openingToken and closingToken are both matching pair delimiters[case 2]
20           if openingToken and closingToken are not part of the same matching pair
21               if closingToken is also an openingToken
22                   mark closingToken as unprocessed opening token
23                   exit loop2
24               else
25                   either exit loop2 or go to line 27.
26
27           pop token on open token stack
28           mark closingToken as processed.
29           do process tokens (from openingToken up to closingToken)
30           exit loop2
31       if closingToken is closing only [case 3]
32           mark closingToken as processed.
33           do process tokens (from token AFTER openingToken up to
                                                        and including closingToken)
34           exit loop2
35
36       if beginning of token list is found [case 4]
37           mark closingToken as processed.
38           do process tokens (from token first token up to and including closingToken)
39           exit loop 2
40       end loop2
41   continue loop1
42 end loop1
              (continued in Fig. 3b)
```

Figure 6

Pseudo code for 3rd embodiment of step 1

```
1   initialize currentToken = last
2   initialize main token list = empty
3   mainloop:
4   if currentToken is last
5        nextToken = get next token from lexical scanner
6        if nextToken is not last
7             append nextToken to main token list
8             currentToken = nextToken
9   if token is opening recursive token
10       push token on open token stack
11  if currentToken is last AND only one token left in main token list
12       exit.
13  if currentToken is unprocessed closing delimiter OR last
14       goto ProcessTokens
15  else
16       currentToken = curentToken->next
17       continue mainloop
18  ProcessTokens:
19  closingToken = currenToken
20  openingToken = token from top of opentokenStack
21  if stack is empty
22       openingToken = first
23
24  if openingToken is openOnly [case 1]
25       startToken = openingToken
26       pop openToken stack
27       endToken = closingToken->previous
28  if openingToken and closingToken are matching pair delimiters [case 2]
29       if openingToken and closingToken are not part of the same matching pair
30            if closingToken is also an openingToken
31                 push closingToken on open token stack
32                 exit loop2
33            else
34                 either exit loop2 or go to line 39.
35       startToken = openingToken
36       pop openToken stack
37       endToken = closingToken
38       mark closingToken as processed
39  if closingToken is closing only [case 3]
40       startToken = openToken -> next
41       endToken = closingToken
    (continued on fig. 7b)
```

Figure 7a

```
43    if closingToken is last [case 4]
44        startToken = openingToken -> next
45        endToken = closingToken -> previous
46    if delimiters are NOT passed to Step 2
47        if openingToken is startToken
48            startToken = openingToken->next
49        if closingToken is endToken
50            endToken = endToken->previous 51    returnToken = Pass2(startToken, endToken)
52    replace tokens from startToken to endToken in the main token list with returnToken
53    currentToken = returnToken 54    continue mainloop
55  end mainloop
```

Figure 7b

Pseudo code for 1st embodiment of step 2

```
1  receive token list to be parsed from Step 1
2
3
4
5
6  loop1:
7      for each rule in the grammar
8
9            loop2 :while search for the rule's pattern in the token list is successful
10               replace the matching tokens in the token list with the rule's repacment  token
11               make the matching tokens children of the rule's replacement token
12               continue loop2 looking for another possible match
13               when search fails
14                   exit loop 2
15           end loop2
16      continue loop1 with next rule
17      when no more rules
18           exit loop1
19 end loop1
20 return parsed token list to Step 1.
```

Figure 8

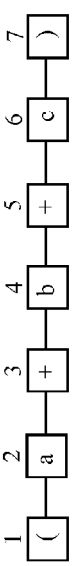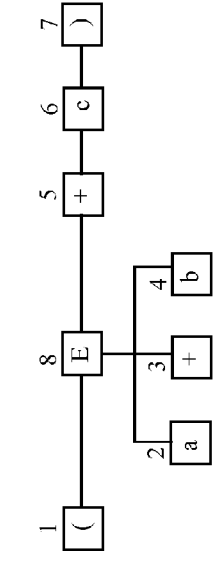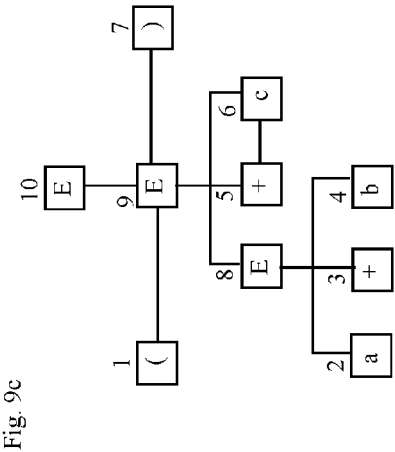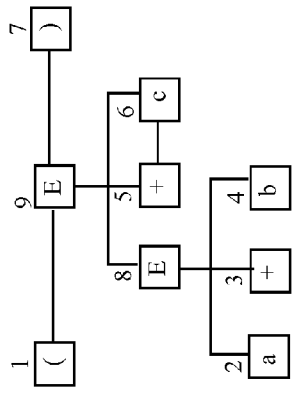
Figure 9

Pseudo code implementation for 2nd embodiment of Step 2

```
1  receive token list to be parsed from Step 1
2  clear rulesToTry array
3  for each token in list
4      if token matches a key
5          set corresponding entries in rulesToTry array to true
6  loop1:
7      for each rule in the grammar
8          if corresponding entry in rulesToTry array is true
9              loop2 :while search for the rule's pattern in the token list is successful
10                     replace the matching tokens in the token list with the
                                                        rule's  replacement token
11                     make the matching tokens children of the rule's replacement token
12                     continue loop1 looking for another possible
13                 when search fails
14                     exit loop 2
15             end loop2
16     continue loop 1 with next rule
17     when no more rules
18         exit loop1
19 end loop1
20 return parsed token list to Step 1
```

Figure 10

Grammar

| Rule | Key | Rule Name |
|---|---|---|
| 1. not [C\|V\|E] + \| - [C\|V\|E] → E | +, - | Unary addition/subtraction |
| 2. C\|V\|E + \| - [C\|V\|E] → E | +, - | Binary addition/subtraction |
| 3. ( E ) → E | ( | Recursive expression |
| 4. if E then S → S | if | If Statement |

Fig. 11a

Key Mapping

| Key | Rules |
|---|---|
| + | 1,2 |
| - | 1,2 |
| ( | 3 |
| if | 4 |

Tokens a + b

| Rules to Try | |
|---|---|
| 1 | Yes |
| 2 | Yes |
| 3 | |
| 4 | |

Fig. 11b

Tokens

( a + b )

| Rules to Try | |
|---|---|
| 1 | Yes |
| 2 | Yes |
| 3 | Yes |
| 4 | |

Fig. 11c

Tokens

( E )

| Rules to Try | |
|---|---|
| 1 | |
| 2 | |
| 3 | Yes |
| 4 | |

Fig. 11d

Tokens if E then S

| Rules to Try | |
|---|---|
| 1 | |
| 2 | |
| 3 | |
| 4 | Yes |

Grammar

| | Rule | Key | Rule Name |
|---|---|---|---|
| 1. | not [C\|V\|E] + \| - [C\|V\|E] → E | +, - | unary addition/subtraction |
| 2. | C\|V\|E + \| - [C\|V\|E] → E | +, - | binary addition/subtraction |
| 3. | not [if] ( E ) → E | ( | recursive expression |
| 4. | if ( E ) S → S | if | if Statement |

Fig. 12a

Key Mapping

| Key | Rules |
|---|---|
| + | 1,2 |
| - | 1,2 |
| ( | 3 |
| if | 4 |

Tokens ( E )

| Rules to Try | |
|---|---|
| 1 | |
| 2 | |
| 3 | Yes |
| 4 | |

Fig. 12b

Tokens if ( E ) S

| Rules to Try | |
|---|---|
| 1 | |
| 2 | |
| 3 | Yes |
| 4 | Yes |

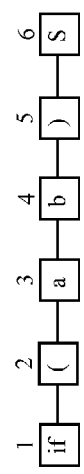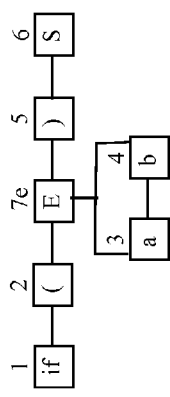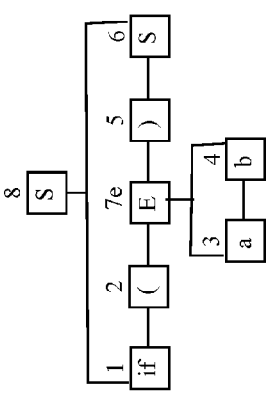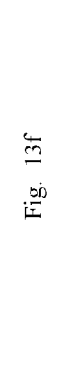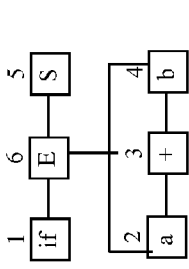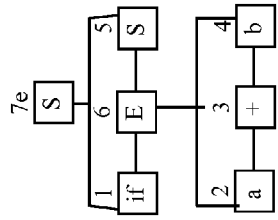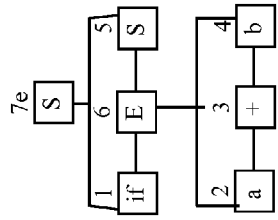
Figure 13

Glossary of symbols used in language definition examples.

A = value to be assigned
B = block
C = constant
D = declaration
E = expression
EL = expression list
ET = end tag
V = variable
I = index
PE = parenthesized expression
S = statement
SL = statement list
ST = start tag
VL = variable list
W =   do/while closing delimiter
a,b,c ... names of variables
| = or
! = not
[ ] a grouping of symbols
[ ]$^{0*}$ zero or more repetitions of a group
[ ]$^{1*}$ one or more repetitions of a group
[ ]$^{0/1}$ zero or one repetition of a group
elements in quotes are fixed symbols or keywords.
→ replaced by

Figure 14

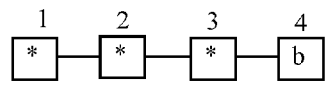

Figure 15a

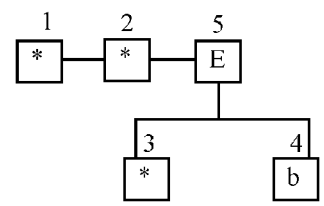

METHOD FOR PARSING PROGRAMMING LANGUAGES AND STRUCTURED DATA

BACKGROUND

Parsers are used to transform programming languages into parse trees or abstract syntax trees. They are also used to convert structured data into data trees. Typically, the input to the process is a text file containing the information to be parsed. The text file is converted into tokens by a lexical scanner or similar program. The parser then transforms the string of tokens into a syntax tree. If parsing a programming language, the parse tree produced by the parser is then optionally transformed by a semantic analyzer, and finally the parse tree is used to create machine code or an intermediate file to be used by an interpreter. FIG. 1 shows the position of a parser in a typical compiler. If parsing structured data, the data tree produced can be used by any program that knows how to manipulate the data contained in the data tree.

Currently, there are two classes of parsers, top down and bottom up. Top down parsers use a grammar that is specified in BNF (Backus-Naur Form or Backus-Normal Form). Grammars described in BNF are complex and certainly not intuitive. Bottom up parsers use a variety of tables which are not easy to construct. In fact, a program called YACC was developed that takes a BNF language description and generates the source code for a bottom up parser.

Both classes of parsers are made to work on input that properly meets the language specification. If there is an error in the input, it can cause a cascading sequence of errors to be reported unless some sort of error mitigation is used. In some cases, the language specification goes so far as to include rules that indicate incorrect usage. These rules match common programming mistakes that, when found, allow the parser to take the proper corrective action.

Programming languages are recursive in nature. Top down parsers are by nature recursive. This can make them difficult to debug. Bottom up parsers, while not recursive, require complex tables in order to parse the recursive structures in programming languages and structured data. Regular expressions, used in find and replace programs such a "grep", cannot be used to parse programming languages because regular expressions cannot handle the recursive nature of programming languages.

INTRODUCTION

This invention takes advantage of the recursive nature of computer languages. Recursion occurs when one parsed structure appears inside of, or is embedded within, a similar structure. For example, $3+5$ is an expression.

$7*(3+5)$ is also an expression that happens to contain within it the expression "3+5".

This is the case of an expression embedded within an expression.

$c=2$ is an assignment statement.

$a=b+c=2$ is also also an assignment statement that contains within it the assignment statement "c=2". This is the case of an assignment statement embedded within another assignment statement.

if $(b>3)$ then $c=2$ is an if-then statement that contains the assignment statement "c=2" within it. This is the case of one statement being embedded within another statement.

if $(a<2)$ then if $(b>3)$ then $c=2$ represents the case where the assignment statement "c=2" is embedded within the if-then statement "if (b>3) then c=2", which in turn is embedded within another if-then statement.

All cases of recursion must somehow be delimited. In the case of expressions, two delimiters are typically used, most commonly an opening and closing parentheses "( )". Other examples of two delimiter indicators are brackets ({ }, [ ], < >) and keywords such as "begin" and "end". In the case of embedded statements, typically only one delimiter is used. In the case of the assignment statement the delimiter is the equal sign "="; for the if-then statement the keyword "if" is used.

In the case where two delimiters are used to indicate recursion, the delimiters will be referred to as a recursive pair. Where only one delimiter is used, the delimiter will be referred to as either an opening only or a closing only recursive delimiter depending on whether the delimiter precedes or follows the embedded structure.

BRIEF DESCRIPTION

The method described here is more straightforward than either top down or bottom up parsing. It uses a grammar that is expressed in terms of regular expressions (or any other pattern matching scheme). The grammar consists of a pattern of tokens to be found, and a token to replace them with. Such a grammar is more intuitive than a BNF grammar. The method is non-recursive, and error mitigation is straight forward. There is no need to add incorrect rules solely for the purpose of error mitigation.

The method consists of two parts. The first part, referred to here as Step 1, receives tokens from a lexical scanner or similar program that can tokenize the input. It places these tokens into a list, which will be referred to as the main token list. It then searches this list to find the first sequence of tokens in which no recursion occurs. The second part of the method, referred to here as Step 2, parses those tokens into a partial syntax tree. The head of the partial syntax tree created by Step 2 is then placed in the main token list replacing the tokens which were passed to Step 2. The process repeats until the entire input is processed, i.e., when all that remains in the main token list is a single token.

BRIEF DESCRIPTION OF THE DRAWINGS

FIG. 3a shows the first part of the pseudo code for the first embodiment of Step 1.

FIG. 3b shows the continuation of the pseudo code for the first embodiment of Step 1.

FIG. 4 shows the pseudo code for the Process Tokens routine used by the embodiments of Step 1.

FIGS. 5a-5e, shows an example of how the first embodiment of Step 1 works.

FIG. 5a shows the recursive delimiter table for this example.

FIG. 5b show the main token list.

FIG. 5c shows the main token list and syntax tree after the first return from the parsing step.

FIG. 5d shows the main token list and syntax tree after the second return from the parsing step.

FIG. 5e shows the final syntax tree after the third return from the parsing step.

FIG. 6 shows the first part of the pseudo code for the second embodiment of Step 1.

FIG. 7a shows the first part of the pseudo code for the third embodiment of Step 1.

FIG. 7b shows the continuation of the pseudo code for the third embodiment of Step 1.

FIG. 8 shows the the pseudo code for the first embodiment of Step 2.

FIG. 9, comprising FIGS. 9a-9e, shows an example of how the first embodiment of Step 2 works.

FIG. 9a shows the grammar for this example.

FIG. 9b shows the token list to be parsed.

FIG. 9c shows the token list and partial tree after the first match of rule 2.

FIG. 9d shows the token list and partial tree after the second match of rule 2.

FIG. 9e shows the partial syntax tree after the match of rule 1.

FIG. 10 shows the pseudo code for the second embodiment of Step 2.

FIG. 11, comprising FIGS. 11a-11e, shows an examples of how the second embodiment of Step 2 works.

FIG. 11a shows the grammar and key mapping table for these examples.

FIG. 11b shows a sequence of tokens to be parsed and the resulting table of rules to try.

FIG. 11c shows another sequence of tokens to be parsed and the resulting table of rules to try.

FIG. 11d shows another sequence of tokens to be parsed and the resulting table of rules to try.

FIG. 11e shows another sequence of tokens to be parsed and the resulting table of rules to try.

FIG. 12, comprising FIGS. 12a-12c, shows more examples of how the second embodiment of Step 2 works.

FIG. 12a shows the grammar and key mapping table for these examples.

FIG. 12b shows a sequence of tokens to be parsed and the resulting table of rules to try.

FIG. 12c shows another sequence of tokens to be parsed and the resulting table of rules to try.

FIG. 13, comprising FIGS. 13a-13h, shows two examples of error mitigation.

FIG. 13a shows the recursive delimiter table for these examples.

FIG. 13b shows the grammar for these examples.

FIG. 13c shows the main token list for the first example.

FIG. 13d shows the main token list and partial tree after an error condition has been detected.

FIG. 13e shows the final parse tree for the first example.

FIG. 13f shows the main token list for the second example.

FIG. 13g shows the main token list and partial tree after rule 1 has been matched.

FIG. 13h shows the final parse tree after an error condition has been detected.

FIG. 14 shows a legend for the symbols used in describing a pattern matching grammar.

FIG. 15, comprising FIGS. 15a-15b, illustrates pattern matching from right to left.

FIG. 15a shows the token list for this example.

FIG. 15b shows the token list and partial syntax tree after a pattern has been matched.

DETAILED DESCRIPTION

Step 1. Finding a Sequence of Tokens in which No Recursion Occurs.

Figures 1, 2:
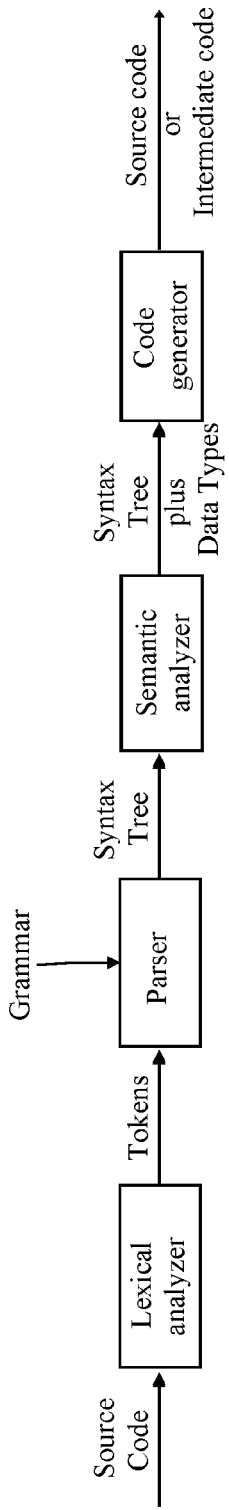
FIG. 1 shows the position of a parser within the compiling process.
FIG. 2 shows a sample recursive delimiter table.

To find a sequence of tokens in which no recursion occurs, a table of recursive delimiters is required. FIG. 2 shows a sample of such a table. The first two columns in each entry contain the opening and closing recursive delimiters. If the delimiter is an opening only delimiter, the closing delimiter column will be empty. If the delimiter is a closing only delimiter, the opening delimiter column will be empty. Only a recursive pair of delimiters will contain entries in both columns.

First Embodiment of Step 1

The first embodiment of Step 1 is shown in FIGS. 3a and 3b, a pseudo code description of this step. It assumes that Step 2 will always return a single token, which will be the head of a partial syntax tree, and that said token cannot itself be a recursive delimiter. This embodiment is presented because it most clearly describes the process.

loop1 (line 1) receives tokens from the lexical scanner. For each token, it adds the token to the main token list (line 4). If the token is a recursive delimiter, it marks the token as unprocessed (lines 5-6). This is unnecessary if the lexical scanner initializes the tokens as unprocessed. If the token is not a closing recursive delimiter, loop1 continues with the next token (lines 7-8). When the end of the main token list is reached, that is, there are no longer any tokens to process (line 2), the method continues at finalProcessing (lines 3 and 43). This is the termination point of loop1.

If the token is a closing recursive delimiter, this token is saved in closingToken (line 10). Then loop2 is entered. loop2 looks at each token in the main token list starting with closingToken and works backwards toward the beginning of the main token list (line 11). If the token is an unprocessed opening recursive delimiter (line 12), it is saved in openingToken (line 13). If no opening recursive delimiter has been found when the loop encounters the beginning of the list, openingToken will be set to null. Otherwise loop2 continues looking at the previous token (line 14). When an unprocessed opening recursive delimiter is found, four cases can occur.

Case 1: the token is an opening only recursive delimiter (line 15)

The opening only recursive delimiter is marked as processed (line 16). The tokens from the opening recursive delimiter up to but not including the closing recursive delimiter are processed (line 17) (see Process Tokens, FIG. 4). loop2 then continues searching backwards looking for another opening recursive delimiter starting with the token returned by the processTokens routine (line 18).

Case 2: the opening and closing tokens are both recursive pair delimiters (line 19)

If both the delimiters form a recursive pair, both are marked as processed (line 27). The tokens from the opening recursive delimiter up to and including the closing recursive delimiter are processed (line 29) (see Process Tokens). Then loop2 is exited (lines 30), and the method goes back to loop1 (line 41) looking for the next closing recursive delimiter starting with the token returned by the processTokens routine. If the opening and closing delimiters are not part of the same recursive pair, the recursive delimiter table is checked again to see if the closing recursive delimiter can also be an opening recursive delimiter. If so, it is marked as an unprocessed opening recursive delimiter, and loop2 is exited (lines 20-23). Otherwise, an error condition has been found, namely that the opening and closing delimiters belong to different matching pairs. The process can either exit loop2, effectively ignoring the closing recursive delimiter, or go to Case 3, thereby treating the closing delimiter as if it were a closing only delimiter (line 25). It can also just continue and treat this case as if the recursive delimiters were a matching pair (line 25).

Case 3: the closing token is a closing only recursive delimiter (line 31)

The closing recursive delimiter is marked as processed (line 32). The tokens, starting with the token after the opening recursive delimiter up to and including the closing recursive delimiter are processed (line 33) (see Process Tokens). Then loop2 is exited (line 34), and the method goes back to loop1 (line 41) looking for the next closing recursive delimiter starting with the token returned by the processTokens routine.

Case 4: the beginning of the main token list was reached without any opening recursive delimiter being found (line 36)

The closing recursive delimiter is marked as processed (line 37). The tokens, starting with the first token in the main token list up to and including the closing recursive delimiter are processed (line 38) (see Process Tokens). Then loop2 is exited (line 39), and the method goes back to loop1 (line 41) looking for the next closing recursive delimiter starting with the token returned by the processTokens routine.

Final Processing

The final processing (see FIG. 3b) occurs when the end of the main token list is reached (lines 2-3). At this point all closing recursive delimiters will have been processed. Final processing searches the main token list from the end backwards toward the first token looking for any remaining unprocessed opening recursive delimiters (line 44). These tokens should be opening only recursive delimiters. When an unprocessed opening only recursive delimiter is found, the delimiter token is marked as processed (line 48). If the opening recursive delimiter is not an opening only delimiter, an error has occurred. Either this token can be ignored or treated as if it were an opening only recursive delimiter. The tokens from the opening only recursive delimiter up to the end of the main token list are processed (line 49) (see Process Tokens). Then the process continues looking for the next opening only recursive delimiter in the main token list, starting with the token returned by processTokens (lines 50, 44). When the head of the main token list is reached, all the recursive delimiter tokens have been processed and loop3 is exited (lines 45-46). All of the remaining tokens in the main token list are then processed (line 52) (see Process Tokens), the result of which should be a single token. This token will be the head of the syntax tree.

Process Tokens

The pseudo code for the Process Tokens function is shown in FIG. 4. The tokens identified in Step 1 are passed to the processTokens function (line 1). Passing the recursive delimiters to Step 2 is optional. Column 3 of the recursive delimiter table (see FIG. 2) will indicate if the delimiters are to be passed to the parsing step. This is determined by the grammar of the language being parsed (see section on Language Specification). If the recursive delimiters are not to be passed, they are omitted when calling the parsing step, Step 2. (lines 2, 3).

If the opening token is an opening only delimiter, only the opening delimiter is passed to step 2. If the closing delimiter is a closing only delimiter, only the closing delimiter will be included with the tokens passed to step 2. If the open and closing delimiters form a recursive pair, both delimiters will be passed to step 2 (line 4).

The parsing step, Step 2, will return a token representing the head of a partial syntax tree (line 5). This token will be inserted into the main token list replacing the tokens that were passed to the parsing step. If the recursive delimiters were not passed to Step 2, only the tokens actually passed to Step 2 will be replaced in the main token list.

Figure 5:
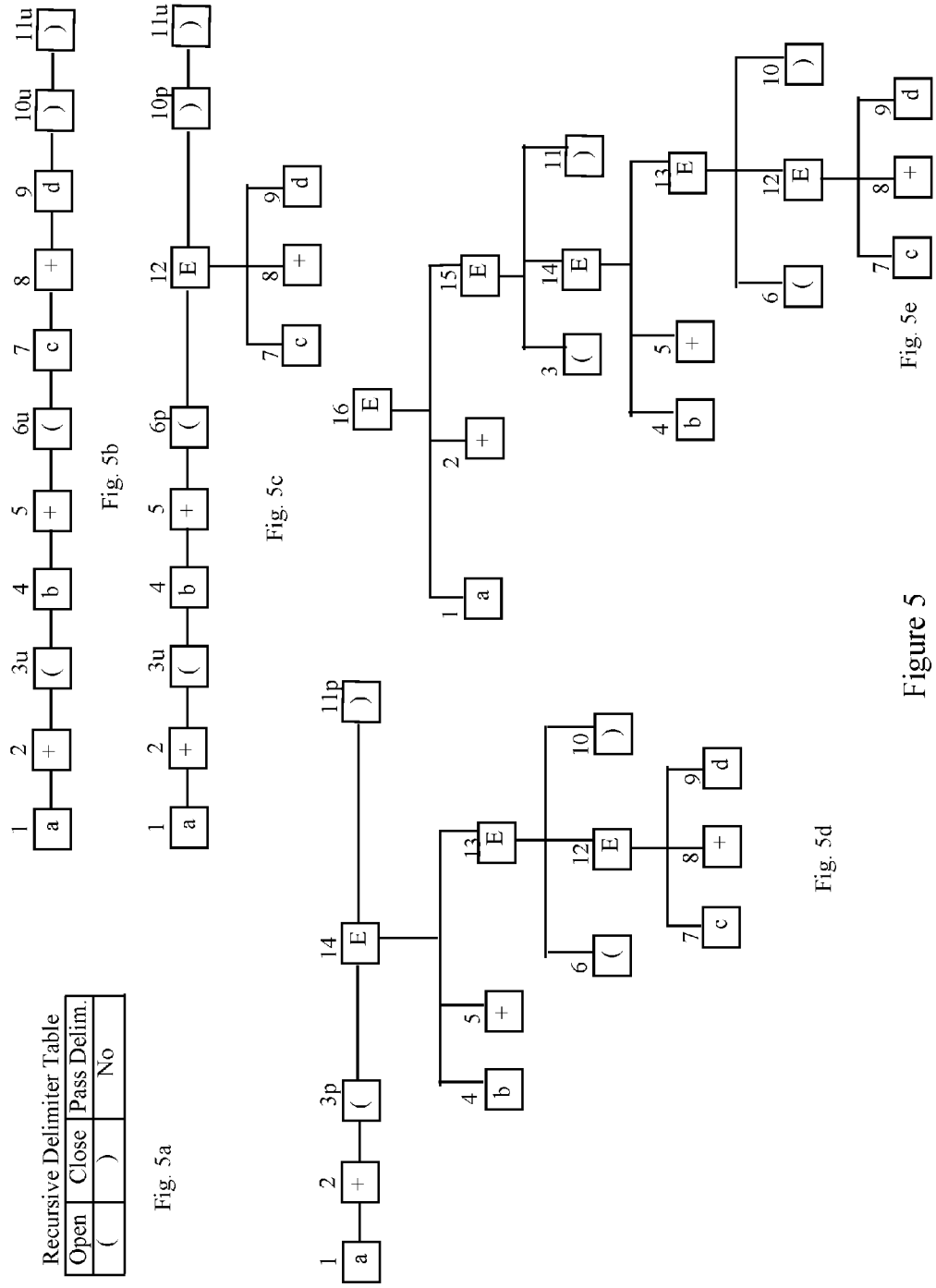
FIG. 5, comprising

FIG. 5 shows an example of the first embodiment of Step 1. FIG. 5a shows a recursive delimiter table. There is only one entry, a matched pair of parentheses. The pass delimiters indication is set to "no", meaning that the recursive delimiters will not be passed to Step 2. FIG. 5b shows the tokens to be processed. The letter 'u' or 'p' next to the token number indicates that the token is unprocessed or processed respectively. The process begins looking for the first recursive closing delimiter. This is token 10. It then works backwards to find the closest unprocessed opening recursive delimiter. This is token 6. The recursive delimiters are now marked as processed. Because the recursive delimiters are not be passed to Step 2, only tokens 7-9 will be passed to Step 2. Step 2 returns token 12 as the head of a partial syntax tree. It is inserted in the main token list in place of tokens 7-9 (FIG. 5c.). The process once again looks for the next unprocessed closing recursive delimiter. It will skip over token 10 because it has already been processed. The next closing recursive delimiter is token 11. The process works backward looking for an unprocessed opening recursive delimiter. It will skip over token 6 because this token has already been processed. The next opening recursive delimiter to be found is token 3. Tokens 3 and 11 are now marked as processed, and tokens 4, 5, 6, and 12 are passed to Step 2. Step 2 returns token 14 as the head of the partial syntax tree. So token 14 is inserted in the main token list in place of tokens 4, 5, 6, and 12 (FIG. 5d). The end of the main token list has now been reached, so final processing is entered. When looking backward for the next unprocessed opening recursive delimiter, token 3 will be skipped because it has been marked as processed. There are no other unprocessed opening recursive delimiters left in the main token list, so all of the remaining tokens in the main token list, tokens 1, 2, 3, 14, and 11, are passed to Step 2. Step 2 returns token 16, which is the head of syntax tree (FIG. 5e).

Second Embodiment of Step 1

The second embodiment of Step 1 is a variation of the first. It simplifies the handling of the opening recursive delimiters. FIG. 6 shows a pseudo code description of this step. For easy comparison, the numbering of the lines is consistent with the pseudo code of the first embodiment (FIG. 3a), so only the differences will be highlighted. Instead of marking the opening recursive delimiters as unprocessed and processed, the second embodiment uses a push down stack. To mark an opening recursive delimiter as unprocessed, a reference to it is pushed on a stack called the openToken stack. (compare line 6 in FIGS. 3a and 6). Instead of marking the opening recursive delimiters as processed, the second embodiment pops the reference to the opening recursive delimiter from the openToken stack (compare lines 16, 27 in FIGS. 3a and 6). loop2 is also simplified in that there is no longer any need to search backwards looking for an opening recursive delimiter. openingToken is assigned directly by using the reference from the top of the openToken stack (see line 11 in FIGS. 3a and 6). Lines 12-14 of the first embodiment are no longer needed. Final processing (FIG. 3b) is the same for both embodiments.

Third Embodiment of Step 1

This embodiment assumes that Step 2 can return more than one token and that any of the tokens returned can represent a recursive delimiter, that is, recursive delimiter tokens can occur not only in the main input stream (leaf nodes), but the rules of the language allow the generation of recursive delimiter tokens (non-leaf nodes) as well. In this embodiment, the parsing step, Step 2, may return either a single partial syntax tree or a list of partial syntax trees. If a list is returned, the entire list returned by the parsing step, Step 2, will be inserted in the main token list replacing the tokens that were passed to Step 2. A pseudo code description of this embodiment is shown in FIGS. 7a and 7b. The values of 'first' and 'last' represent the positions just before the first token of the main token list and just after the last token of the main token list respectively, such that first→next will indicate the first token in the main token list and last→previous will indicate the last token in the main token list. If the lexical scanner fails to return a token, an indication that there are no more tokens left in the input stream, it will return a value of 'last'. A stack, openTokenStack, will contain references to opening recursive delimiters.

currentToken is initialized to 'last' (line 1). This indicates that the last element of the main token list has been processed, and it is necessary to get another token from the lexical scanner. If currentToken is not 'last', this means that the current token is one that was returned from Step 2. The main part of mainloop (lines 4-17) examines each token. It checks to see if the token is a recursive delimiter. If it is an opening recursive delimiter, it is pushed on openTokenStack (lines 9-10). If the currentToken is 'last', indicating that there are no more tokens to be gotten from the lexical scanner, and only one token remains in the main token list, the exit from mainloop is taken (lines 11-12).

If currentToken is a closing recursive delimiter or 'last', the process goes to ProcessTokens (line 21), which will send the appropriate tokens to Step 2 to be parsed (lines 13-14). Otherwise, currentToken is advanced to the next token in the main token list, and the process continues looking at the next token (lines 15-17). If the current token is the last one in the main token list, the next token will be 'last'. This indicates that the lexical analyzer must be called to get another token.

ProcessTokens (lines 18-53) determines which tokens will be sent to Step 2 to be parsed. closingToken is set from currentToken (line 19). openingToken is set to the token referred to by the top of openTokenStack. If openTokenStack is empty, openingToken is set to the value 'first' (lines 20-22). Then openingToken and closingToken are examined. Four cases can occur.

Case 1. openingToken is an opening only recursive delimiter (line 24)

startToken is set to openingToken; the openTokenStack is popped (line 25-26). This indicates that the opening token has been processed.
endToken is set to closingToken→previous (line 27).
continue at line 46.

Case 2. the opening and closing tokens are both recursive pair delimiters (line 28)
If the opening and closing tokens form a recursive pair
startToken is set to openingToken; the openToken stack is popped. (line 35-36).
endToken is set to closingToken; closingToken is marked as processed. (line 37-38).
continue at line 46.
If the opening and closing token are not part of the same recursive pair, the recursive delimiter table is checked again to see if the closing recursive delimiter can also be an opening recursive delimiter. If so, it is pushed on openTokenStack, and and loop2 is exited (line 30-32). If the closing delimiter cannot also serve as an opening recursive delimiter, an error condition has been found. The process can either exit loop2, effectively ignoring the closing recursive delimiter, or go to Case 3 (line 39).

Case 3. the closing token is a closing only recursive delimiter (line 39)
startToken is set to openingToken→next (line 40).
endToken is set to closingToken; closingToken is marked as processed. (line 41-42).
continue at line 46.

Case 4. closingToken is 'last'. (line 43)
startToken is set to openingToken→next (line 44).
endToken is set to closingToken→previous (line 45).

The recursive delimiter table is checked to see if the delimiter tokens are to be passed to Step 2. (see FIG. 2). If not, if startToken is a an opening recursive delimiter, startToken is replaced by startToken→next, and if endToken is a closing recursive delimiter, endToken is replaced by endToken→previous (lines 46-50).

Then the tokens from startToken to endToken are passed to Step 2 (line 51). Step 2 will return either a single token or a list of tokens. The tokens from startToken to endToken are removed from the main token list and replaced by the token or list of tokens returned from Step 2. Note that if the recursive delimiter tokens were not passed to Step 2, they will not be replaced because they were were excluded from the list of tokens passed to Step 2 by the adjustments made to startToken and endToken (lines 46-50). currentToken is then set to the token returned from Step 2, or, if a list is returned, the first token in the list (line 53). Note there is no increment of the value of currentToken, because the token returned could itself be a recursive delimiter. This allows mainloop to examine the returned token(s) and take the appropriate actions if any of the returned tokens are recursive delimiters. The mainloop will continue (line 54) until there are no more tokens to be received from the lexical scanner and only one token remains in the main token list (line 11-12). This token will be the head of the complete syntax tree.

Step 2. Parsing Tokens into Partial Syntax Tree

Any parsing mechanism can be used in Step 2. However, since Step 1 insures that no recursion can occur within the given set of tokens to be parsed, the actual parsing mechanism no longer needs to be concerned with recursion. So even if traditional parsing methods (top down/bottom up) are used for Step 2, their implementation will be much simpler because they no longer need to deal with the recursive aspects of programming languages.

Because no recursion can occur within the token list passed to Step 2, new types of grammars and parsing algorithms, which will be simpler, more intuitive and easier to implement than the traditional parsing methods, can be used. In particular, this invention uses a search and replace parsing mechanism, i.e., regular expressions.

The first embodiment for Step 2 is shown in pseudo code in FIG. 8. Each rule in the language consists of a pattern of tokens to be matched and a replacement token. (see section on Language Specification). The method for parsing is as follows:

The token list to be parsed is received from Step 1 (line 1). For each rule in the language, the token list is searched to find a sequence of tokens that matches the pattern in the rule (lines 7, 9). If found, the tokens matched by the pattern are replaced in the token list by the replacement token specified in the rule (line 10). The tokens matched by the pattern are then made children of the replacement token (line 11). The search then continues to see if there are more matches for the current rule (line 12). When no more matches are found, the process exits loop2 (lines 13-14) and goes on to the next rule (lines 16, 7). This continues until all the rules have been tried (lines 17-18). The token list is then returned to Step 1 (line 20). This may result in either a single token or a list of tokens being returned to Step 1.

FIG. 9 shows an example for this embodiment. FIG. 9*a* shows a simple grammar of two rules. FIG. 9*b* shows the tokens that have been passed to Step 2. The first rule is an addition rule. It matches tokens 2-4. So tokens 2-4 will be replaced by token 8, the replacement token E, and tokens 2-4 become children of token 8 (FIG. 9*c*). An attempt is made to match this rule again. Tokens 8, 5, and 6 match the rule and are replaced by E, token 9 (FIG. 9*d*). Another attempt to match the pattern for rule one is made, but there are no tokens remaining that form a match. The second rule, the recursive expression rule, is now tried. And it matches tokens 1, 9, and 7. So tokens 1, 9, and 7. are replaced by E, token 10, and tokens 1, 9 and 7 become children of token 10 (FIG. 9*e*). An attempt to find another match for rule 2 is made, but fails. There are no more rules to try. Token 10 is now the head of a partial syntax tree. Token 10 is returned to Step 1. Note that not just token 10 is returned, but the entire tree of which token 10 is the head.

The Second Embodiment for Step 2

Because a language may have a large number of rules, it may not only take a long time to try every rule, but most of the rules will not find any match. The second embodiment employs a prescan of the tokens to determine which rules have a chance of matching, so that only the rules for which a match is possible need to be tested. Each rule is assigned a key. If the key is found within the tokens passed to Step 2, the rules associated with the key are marked in an array which contains one entry per rule.

The keys are usually operators, keywords, or delimiters. In some cases, the identifying token may not indicate a unique rule. For example, the minus operator "−" could be found in two rules, that is, both a unary minus rule and a binary minus rule. The keyword "if" would indicate that only a single rule, the if statement rule, has to be tried. Also, a rule could have more than one key. A rule that includes multiple operators, such as an addition/subtraction rule, would have two keys, the plus operator "+" and the minus operator "−".

The prescan will search all tokens in the token list passed to Step 2. If a token matches one of the keys, the appropriate entries in the rule array will be set. The pattern matching part of Step 2 now only has to attempt to match patterns for rules whose corresponding entry in the rules array has been set. If the entry corresponding to a rule is false, the rule can be skipped. As an alternative, a bit map may be used in which each bit corresponds to a rule. By using a find next one instruction, the search for possible rules to be tried will be very efficient.

FIG. 10 shows the pseudo code for this embodiment. The line numbering is the same as the first embodiment of Step 2 (FIG. 8), so only the differences will be highlighted. As in the first embodiment, a token list is received from Step 1 (line 1). The array rulesToTry is cleared by setting each entry in it to false (line 2). The array rulesToTry contains one entry for each rule. Then the token list received from Step 1 is scanned looking for tokens that match any of the keys. If a match is found, the corresponding entries in the rulesToTry array are set to true (lines 3-5). loop1 goes through the rules in the grammar, but only attempts to match a rule if its corresponding entry in the rulesToTry array is set to true (line 8).

FIG. 11 shows an example of this embodiment. A sample grammar of four rules and their keys is shown in FIG. 11*a*, as well as the mapping table showing which keys trigger which rules. FIG. 11*b* shows a simple string of tokens. The only symbol which is a key is the "+" sign. Based on the key mapping table of FIG. 11*a*, rules 1 and 2 needs to be tried. FIG. 11*c* shows a more complex string of tokens. Here there are two keys present, the "+" sign and the open parenthesis "(". Based on the key mapping table, it is clear that three rules need to be tried. FIG. 11*d* shows a string of tokens in which only one key is present, the open parenthesis "(". So the key mapping indicates that only rule 3 needs to be tried. Finally, FIG. 11*e* shows a sequence of tokens representing an if statement. As in the previous example, only one key is present, the "if" keyword. So only rule 4 is marked to be tried.

FIG. 12 shows a slightly different example. The grammar is the same as in FIG. 11*a*, except for the last rule, the if statement rule. Instead of delineating the condition of the if statement with keywords, "if" and "then", the grammar in FIG. 12*a* uses a C style syntax, delineating the condition with parentheses, "("and")". FIG. 12*b* is the same as FIG. 1*c* and shows they both have the same result. But in FIG. 12*c*, two keys are present, the keyword "if" and the open parenthesis "(". The key mapping for the keyword "if" is to select rule 4. And the delimiter "(" is mapped to rule 3. So although only the if statement rule, rule 4, will match the string of tokens in FIG. 12*c*, the recursive expression statement rule, rule 3, will also be tried. As can be seen, the scheme of the second embodiment of Step 2 reduces the number of rules that need to be tried, but does not guarantee that the minimum number of rules are tried.

Error Handling.

The method described here is designed to work on well-formed input, that is, input in which no errors exist. In practice, however, syntactic errors often occur in the main input stream. It is possible for a single error to cause a multitude of errors to be generated throughout the parsing process. To prevent a single error from propagating into a multitude of errors, some form of error mitigation is necessary. The best place to catch errors is at the end of the parsing step. Usually the result of the parsing step, Step 2, produces a single token. So if a list of tokens is returned, it can be assumed that an error has been encountered. When this happens, a suitable token can be substituted in place of the multiple tokens returned by the parsing step and inserted into the main token list. The substitution token is based on the type of recursive delimiters that were found. For each entry in the recursive delimiter table, a suitable type can be included to indicate what token type should be used in the event of the failure of the parsing step to produce a single token. This is shown in the 4th column of the recursive delimiter table (see FIG. 2). For example, if the recursive delimiters were parentheses, "(" ")", the most common result from the pattern match step would be an expression. So a token of type "expression" would be substituted in the main token list in place of the token list returned from the parsing step. If the delimiter were the keyword "if", an open only recursive delimiter, a token of type "statement" could be substituted.

In cases where the recursive delimiters can appear in different contexts, the token type to be substituted can be either the most common token type or a token of multiple types. For example, parentheses are used both in expressions and function calls. In expressions, the result will be another expression. In a function call, an expression list would be expected. So a token with two types, "expression" and "expression list", could be created as a substitute token. In matching the grammar rules, this token would be a match for rules containing either type of token. If rules in the grammar exist such that Step 2 can return more than one token, then the tokens returned from the parsing step need to be inspected to determine if the result is valid or not. But the same error mitigation scheme is still used.

FIG. 13 shows two examples. FIG. 13a shows a recursive delimiter table. The first entry is a pair of parentheses, the second an opening only delimiter for the keyword "if". FIG. 13b shows a simplified grammar containing two rules, an addition rule and an if statement rule. FIG. 13c shows a main token list in which the plus sign is missing between tokens 3 and 4. The first closing delimiter that is found is the closing parenthesis, token 5. Working backwards, the opening parenthesis is found, token 2. The recursive delimiter table (FIG. 13a) indicates that the delimiters are not to be passed to the parsing step. As a result, only tokens 3 and 4 are passed to the parsing step. There is no rule that matches tokens 3 and 4. If the missing plus sign were present, the addition rule would have matched. The parsing step returns the same two tokens that were passed to it. This is an error condition. If some form of error mitigation is not applied, the entire main token list will fail to match any pattern in the grammar creating more errors. But the recursive delimiter table (FIG. 13a) indicates that a token of type E, "expression", can be substituted. The result is shown in FIG. 13d. The "e" next to token 7 indicates that this is an error substitution. Since there are no more closing delimiters in the main token list, the method searches backwards from the end looking for any opening only delimiters. Token 1, the keyword "if", is found. All the tokens in the main token list are now passed to the parsing step. This sequence of tokens matches rule 2 in the grammar (FIG. 13b), and the parsing step returns the appropriate token, token 8. Token 8 is now placed in the main token list replacing tokens 1, 2, 7, 5, 6, which become children of token 8 (FIG. 13e). Because of the substitution when the error condition occurred, the method continued without further errors being generated.

In FIG. 13f, the parentheses which delineate the condition of the if statement are missing in the main token list. There are no closing recursive delimiters in the main token list, so by working backwards from the end, token 1, the keyword "if", an opening only recursive delimiter, is found. In this case, the entire main token list, the opening only recursive delimiter, token 1, up to the last token, is sent to the parsing step. Tokens 2-4 match rule 1, and the replacement token, token 6, replaces tokens 2-4 in the token list (FIG. 13g). There are no more matches of the addition rule, so rule 2, the if statement rule, is tried. Because the parentheses are missing, rule 2 does not match. The parsing step returns the tokens 1, 6, and 5. More than one token has been returned indicating an error condition. Consulting the recursive delimiter table, the error substitution is a token of type S, "statement". So token 7 is created and placed at the head of the syntax tree (FIG. 13 h).

Language Specification

What follows are examples of various types of rules to demonstrate how a language might be described using the pattern matching method described above, since the rules to describe a language in this manner differ from standard BNF notation. The examples are presented for illustration purposes only. They are not intended to be a complete representation of any language. FIG. 14 shows a table of the symbols used in this section.

Precedence Order

The rules must be specified in precedence order, highest precedence first. In BNF, the rules can be in any order because precedence is built into the rules of the language. The general order of the rules is: variables, lists of variables, expressions, lists of expressions, statements, and lists of statements.

Binary Operator Rules

The most common operands for binary operator rules are expressions, constants, and variables. The assignment operator "=" is an exception, since the left hand side of this rule can only be a variable.

The basic pattern for binary operators is

E|C|V operator(s) E|C|V→E

Examples:

E|C|V*|/E|C|V→E multiply/divide rule

E|C|V+|−E|C|V→E plus/minus rule

Note that the multiply/divide rule comes before the addition rule because the multiply/divide operator has a higher priority than the plus/minus operator.

Binary rules using prefix or postfix notation follow the same general pattern, except that the elements in the rule are switched around.

Examples:

+|−E|C|V E|C|V→E plus/minus prefix notation

E|C|V E|C|V+|−→E plus/minus postfix notation

Context

Some symbols within a language can have more than one meaning. Therefore the language definition must have a way of separating the various meanings. This requires that some rules contain contextual information to distinguish between the different meanings.

One such case is unary operators. Many unary operators are also binary operators. So a distinction must be made between the two. For example, is the "+b" in a+b a unary or binary operator?

The feature that distinguishes the two forms of the operators is that the binary form of the operator comes between two operands (a variable, expression or constant) while the unary form of the operator cannot be preceded by an operand. Since unary operators have precedence over binary operators, the rules for unary operators must come before those of the binary operators in the grammar. So unary rules must check their context to be sure that they are, in fact, unary operators and not really binary ones. Instead of the simple pattern of "operator operand", the rule must be of the form not [operand] operator operand And example of a unary rule pattern is not [V|E|C]+|−|*|& V|E|C→E This notation ensures that the unary operator will not be confused with the binary operator.

Recursive Delimiters

Recursive delimiters can also have various meanings. Parentheses are a common case.

In C, parentheses can appear in the following ways.

(1) foo (a+b)−c
(2) (a+b)−c
(3) if (a+b)−c
(4) while (a+b)−c

All three items contain the sequence of tokens "(a+b)−c", but in each case, the meaning is different.

In (1), a variable followed by parentheses indicates a function call. "a+b" is a parameter and not part of the expression "(a+b)−c", This statement means "c" is subtracted from the value returned by the function "foo".

In (2), the parentheses contain an expression. The result is that "c" subtracted from the result of the expression "a+b".

In (3) and (4), the keywords "if" and "while" indicate a type of statement, and "a+b" is the condition for the if and while statements. "−c" (unary operator) is the statement to be executed if the condition is true.

Furthermore, in a language like C, for "a+b" to be the parameter of a function call, or the condition of an if/while statement, it must be enclosed in parentheses. But the normal recursive expression rule in BNF (E)→E does not indicate this. The rule must be changed to (E)→PE where PE indicates an expression in parentheses. Doing so now requires a change to the both the binary and unary operator rules. The token type PE must be added.

not [PE|E|C|V] operator PE|E|C|V→E (unary operator rule)

PE|E|C|V operator PE|E|C|V→E (binary operator rule)

Because function calls have priority over operators, no context checking is necessary. But unary and binary operators have priority over statements. So all of the unary and binary operator rules would need to have context information added to them. The new binary rule with context checking is not [if|while] PE|E|C|V operator PE|E|C|V→E The if and while statements would be if PE S [else S]$^{0/1}$
while PE S This solution is cumbersome and unnecessarily complicates all of the unary and binary operator rules. It also reduces the clarity of the grammar.

The operator rules can be simplified a little by changing the recursive expression rule to (E)→PE|E By allowing the replacement token to contain multiple types, the token PE can be removed from the operator rules. However, all the operator rules would still have to check for context.

The problem here is that the context information occurs outside of the recursive delimiters "(" and ")". A better solution is not to pass the recursive delimiters to the parsing step, Step 2. In this way, only the rules that actually contain the recursive delimiters need to check context. The only rule that does this is the recursive expression rule (E)→E So to check context, the rule becomes not [if|while] (E)→E and the if and while statement rules become if (E)S [else S]$^{0/1}$→S
while (E) S→S This simplifies the grammar and makes it more intuitive to read. It also eliminates the need for extra token types such as PE. However, some changes to the order of the rules must be made to accomplish this. Namely, all the rules that contain recursive delimiters that are not passed to the parsing step, Step 2, need to have the highest priority, i.e., they must come at the beginning of the grammar. The precedence order of these rules follows the same pattern as the regular rules, namely, variables, expressions, and statements.

There is no problem here with leaving the recursive tokens in the main token list after the parsing step, Step 2, because they will have been marked as processed. This effectively removes the recursiveness property from these tokens, so they will not be reprocessed as recursive tokens when the first part of the method, Step 1, regains control.

Assignment Statement

The assignment operator "=" is an opening only recursive token in languages that allow multiple assignments in a single statement. Because the assignment operator comes in the middle of its operands, it would require two rules for its specification if the assignment recursive delimiter token is passed to the parsing step, Step 2.

=E|C|V→A where the assignment token A represents the value to be assigned, and

VA→E which assigns the value from the previous rule to a variable. However, if the opening only recursive delimiter "=" is not passed to the parsing step, a single rule will suffice.

V=E|C|V→E

The rule now has a more intuitive look, given that it appears in the same way the statement occurs in the source language. Once again, because the recursive delimiter is not passed to the parsing step, Step 2, this rule must come before the standard rules of the language.

The decision whether to pass the delimiters to the paring step, Step 2, must be made on a case by case basis. Normally, single delimiters (opening only and closing only) would be passed to the parsing step, particularly if the delimiter is the first element in a rule. The assignment operator, however, is an opening only recursive delimiter that comes in the middle of its rule. So, as has been seen, it might be preferable not to pass the assignment delimiter to the parsing step, Step 2.

For matching pair delimiters that require context, not passing the delimiters to the parsing step, Step 2, is generally a good idea. It can give the rules a more intuitive look. If matching pair delimiters do not require context checking, passing the delimiters to the parsing step is optional. An example is array indices in C. Passing the delimiters to Step 2, the rules look as follows.

'['E|V|C']'→I
VI→V

By not passing the delimiters, the need for the I token is eliminated. The rule for arrays becomes

V '['E|V|C']' →V

Note that the index rule results in a variable. This is because an array reference can appear on the left side of an assignment statement. There is no need to create some other token type for this rule. The difference between an actual variable (a leaf node) and a reference to a variable can easily be distinguished because a leaf node has no children. Array index rules have priority over operator rules, since they result in a token of type variable. Since variables can be the operands of operator rules, array index rules must be evaluated first. The goal is to produce a grammar that has a more intuitive look, that is, the rules should look more like the statements in the source language.

Lists

Lists of items are often separated by commas. So a rule for variable lists could be

V [, V]$^{1}$*→VL

An expression list is similar to a list of variables, except it allows constants and expressions in it as well as variables.

E|C|V [, E|C|V]$^{1}$*→EL

Lists of statements are often separated by semicolons. In C, all statements are terminated by semicolons, so the rule would be

S; [S;]$^{1}$*→SL

Using Lists

In C, multiple declarations can be specified in a single statement.

int a, b, c;

where "a, b, c" is a variable list. A general expression list cannot be used here because an expression list allows the use of constants and expressions, neither of which can be declared. So a declaration rule could be int|float|short|long|signed|unsigned V|VL→D Since a variable list is a subset of the expression list, it needs to have higher priority than an expression list. If this were not the case, the expression list rule would always be a match for a variable list, and there would be no way for the variable list rule to be used.

Procedure calls usually take the following forms.

foo ( ) no parameters foo (a+b) one parameter foo (1, 2+b, c) multiple parameters (an expression list)

foo (a, b, c) multiple parameters (a variable list)

The name of the procedure is a variable. The individual parameters can be expressions, constants or variables. The procedure rule would look as follows.

V (NULL|E|C|V|EL|VL)→E

NULL is used when there are no parameters.

E|C|V is used for one parameter only.

EL is used to indicate a expression list, i.e. multiple parameters, since multiple parameters are usually a list of expressions.

VL is also used to indicate a parameter list. It must be specified separately because a variable list is actually a subset of a expression list.

Blocks

Lists of statements are usually contained in blocks. Blocks are a collection of statements delimited by symbols, usually "{ }" or keywords such as "begin" and "end".

Examples of such rules would be

{SL|S|NULL}→B begin SL|S|NULL end→B

NULL represents a block with no statements.

S represents a block with only one statement.

SL represents a block with multiple statements.

Context of { }

In C, curly brackets are used not only to indicate blocks, but to indicate the initialization of structures as well. So if the block rule comes before initialization of structure rule, the rule for blocks must be modified to check that it is not really an initialization. The rule would become not [=] {SL|S|NULL}→B Replacement Tokens as Recursive Delimiters In markup languages, tags are not terminal symbols. An example of a tags is <name> Joe </name>

The rules for the tags would be

<V>→ST (opening recursive delimiter)

</V>→ET (closing recursive delimiter)

where V, a variable, is the name of the tag. Both of these result in recursive delimiters. Start tag and end tag form a matched pair of recursive delimiters. When returning to the first step, Step 1, of the parsing method, these will be processed like any other recursive delimiter. Note that the same closing delimiter ">" is used in the recursive delimiter table as a matching pair delimiter for both the opening delimiters "<" and "</".

Another case is the do while statement in C.

while (a<1) a=0;

do a=0; while (a<1);

As has been seen earlier, the "while" of the first statement is an opening only recursive delimiter. In a do-while statement, "while" is a closing recursive delimiter matching the opening recursive delimiter "do". In other words "do" and "while" form a matching pair of recursive delimiters. So the "do-while" statement requires two rules.

do S while→W (open only recursive delimiter)

W(E)→S where W is an opening only recursive delimiter. Because the condition for the "do-while" statement comes outside of the opening and closing recursive delimiters, the second rule above is required to complete the parsing of this statement. If the opening and closing recursive delimiters are not passed to the parsing step the rule could look like do S while (E)→S Note that in this case, the keyword "while" will appear twice in the recursive delimiter table, first as the closing delimiter of a recursive pair, and second as an opening only recursive delimiter. When the keyword "while" is first encountered, it will be considered as a closing recursive token. But if its corresponding opening token is not "do", the "while" token will be reassigned to its second entry, an opening only recursive delimiter.

Pattern Matching Direction.

So far it has been assumed that the pattern search has been from left to right and that the pattern matching process would continue starting at the point of the replacement token. It is also possible to allow the pattern matching to be done from right to left. Where multiple unary operators are allowed, such as the "*" operator in C, the rule could be

* [E|V]→E

Because several "*" operators can occur in a row, the rule would need to be applied several times. By pattern matching from left to right, the pattern matcher would always have to start at the beginning of the series of tokens to be matched to be sure that all of the tokens were matched correctly. By matching from right to left, the pattern matcher would be able to continue matching at the point of the last matched pattern. FIG. 15 illustrates this. FIG. 15a shows the tokens to be parsed. By doing the pattern matching from left to right, tokens 3 and 4 match the pattern. They are replaced by token 5 (FIG. 15b). If the pattern matching were to continue from token 5, no more matches would be found. So tokens 1 and 2 would remain unparsed. To insure that all of the tokens were parsed correctly, the pattern matching would always have to restart at the beginning of the sequence of tokens. However, if the pattern matching occurs from right to left, tokens 3 and 4 would still match the pattern (FIG. 15b). But the pattern matching could now continue from token 5. The pattern matcher would find that tokens 2 and 5 match the pattern. Continuing this way, from right to left, all of the "*" operators would be matched correctly. Alternatively, the pattern could be

*[*]⁰* E|V→E
which would require only one match for the entire sequence of tokens, instead of a separate match for each * operator.

In a language such as APL, where the precedence of binary operators is simply right to left, having the pattern matcher go from right to left may simplify the rules.

Tokens with More than One Type

Some languages do not have protected keywords. So, for example, "if" could be both a keyword and a variable name. This condition is handled by assigning the token representing "if" two types, keyword and variable. Such a token would be a match for any rule containing a variable in it as well as any rule containing the keyword "if". So both of the following rules would be matched when the "if" token is encountered.

if (E) S→S ("if" as an if statement)
C|V|E+|−C|V|E→E ("if" as a variable)

The differences between these two rules are usually sufficient that the keyword usage of "if" cannot be confused with the variable usage of "if". However, if (E)

by itself could be a function call, where "if" is the name of a function, which looks identical to the beginning of the "if" statement rule. Since function calls have priority over statements, the function call rule would need to check its context.

if (E) not [S]

Only the "if" statement ends with a statement. So if "if" is used as the name of a function, it cannot be followed by a statement.

Creating a Recursive Delimiter Table.

To determine which language elements are recursive, the language definition is examined to determine which symbols or keywords are used to indicate the recursive elements. These will be the delimiters that will go in the recursive delimiter table. Delimiters that are usually associated as pairs will go in the recursive delimiter table as recursive pairs. These are usually used to delineate expressions and lists. Opening only and closing only tokens are usually associated with statements. The assignment operator "=" and the keywords "if" and "while" are examples.

The pass delimiter flag in a recursive delimiter table is usually set to true if the delimiters in question have only one use. For example, in C, square brackets "[ ]" are used to delimit array indices. They are used for no other purpose. However, parentheses "( )" are used in several different ways: to override the precedence of operators in expressions, to contain parameters of functions, and to delimit the conditional expression in "if" and "while" statements. So, in this case, the pass delimiters flag is set to false.

For opening only and closing only recursive delimiters, the delimiter will be passed if it is needed to properly parse tokens. Usually this means that the recursive delimiter is the first element in the pattern in which it is used. For example, the keyword "if" should have the pass delimiter set to true because the rule for if statements will begin with the keyword token "if". The recursive assignment delimiter would have the flag set to false, because the rule for assignment statements does not begin with the operator token "=".

Example Computer System

Figure 16:
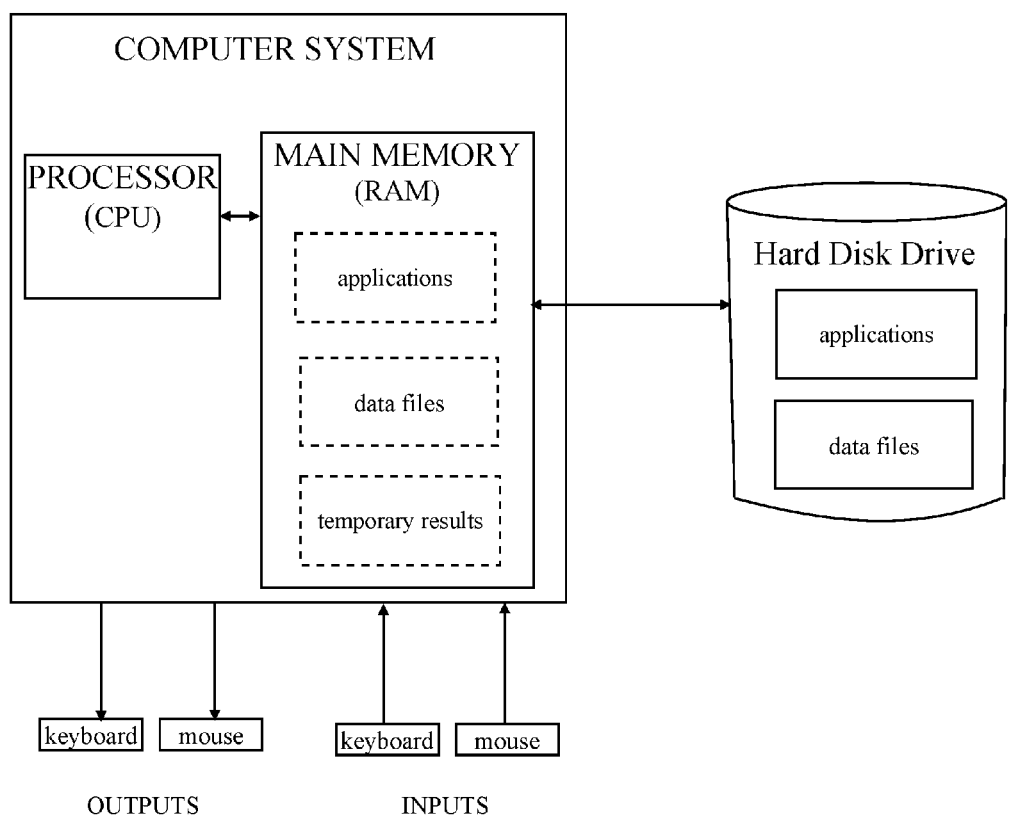
FIG. 16 shows an example of a computer system on which the embodiments of the invention may be implemented.

The embodiments of this invention are intended to be implemented on a computer system. FIG. 16 illustrates an example of a suitable computer system environment that may be used in implementing the embodiments that have been described above. A computer system minimally consists of a processor or CPU; main memory, usually some form of RAM; and a permanent storage device, such as a hard disk drive. It will also consist of input and output devices. Input devices might include a keyboard and a mouse. Output devices might include a monitor and a printer. The processor or CPU controls the processing of the system functions and requests of the system. The processor is capable of executing a software application which is in main memory. In a typical computer system, applications and data files are stored on the hard disk drive or a similar permanent storage device.

By using the keyboard or mouse, a user may request the computer to run a particular application. To do so, the processor copies the application from permanent storage into the main memory. From there, the processor executes the application by executing each of the instructions stored in the software application. For the purposes of this invention, the application will contain the instructions necessary to implement the embodiments described above. If any data files are needed as input to the application, the application will contain instructions to load the data files from the hard disk drive into main memory. Temporary results of the execution of the application are also stored in the main memory. The final results of the execution of the application are either copied back to the hard disk drive, or sent to an output device such as the monitor or printer, or both.

CONCLUSION

A method for parsing computer languages and structured data has been shown. The embodiments show how it is possible to find sequences of tokens in the main token list that contain no recursive elements, as well as how pattern matching can be used instead of the traditional top down and bottom up methods to create partial syntax trees. The method does not need to use pattern matching, but can use any parsing technique to create partial syntax trees, including new ways not yet discovered. It has been shown how simple error mitigation is possible. A demonstration of how to specify the rules for a language when using pattern matching has been given, showing how the rules can be made more intuitive than the usual specification of a grammar in BNF.

The invention claimed is:

1. A method for deriving, by a processor, a full syntax tree from a programming language text file that is both grammar driven and non-recursive and that allows the use of regular expressions to define the grammar of a recursive programming language, the method comprising:

receiving, by the processor, a text file containing information to be parsed;

tokenizing, by the processor, the information to be parsed within the text file to generate a plurality of tokens;

organizing, by the processor, the plurality of tokens into a main token list, containing some tokens that represent recursive delimiters;

performing, by the processor, the steps of:

step 1: identifying, by the processor, a first sequence of tokens in the main token list, the first sequence of tokens identified by locating a sequence of tokens bounded by an opening and closing recursive delimiter, the sequence containing no recursive delimiters; and step 2: generating, by the processor, a partial syntax tree from the first sequence of tokens, the generating comprising:

applying, by the processor, each rule in a rule list to the first sequence of tokens, the rule list being a list of rules which defines the grammar of a recursive programming language, each rule comprising a regular expression and an associated replacement token, the applying comprising the steps of:
   finding, by the processor, a sub-sequence of tokens within the first sequence of tokens that matches the regular expression of the rule;
   creating, by the processor, a portion of the partial syntax tree corresponding to the found sub-sequence of tokens, the portion of the partial syntax tree comprising the replacement token associated with the rule as the head of the portion of the partial syntax tree and the found sub-sequence of tokens as the children of the replacement token;
   inserting, by the processor, the portion of the partial syntax tree in place of the sub-sequence of tokens, wherein the head of the portion of the partial syntax tree is located at the previous location of the sub-sequence of tokens;
   repeating, by the processor, the applying of the rule until all occurrences of the regular expression in the first sequence of tokens are found; and
   continuing, by the processor, the applying with the next rule in the rule list until all the rules in the rule list have been applied and the partial syntax tree is complete;
replacing, by the processor, the first sequence of tokens in the main token list with the completed partial syntax tree which resulted from applying the rules in the rule list if the first sequence of tokens contains only one remaining token, or if more than one token remains in the first sequence of tokens after applying the rules in the rules list: creating an error token as a head of a new partial syntax tree, making the tokens remaining in the first sequence of tokens the children of said error token and replacing the first sequence of tokens in the main token list with said new partial syntax tree;
marking the opening and closing delimiters as processed, wherein the marking transforms the recursive delimiters into a non-recursive state; and
repeating, by the processor, step 1 and step 2 for a next sequence of tokens in the main token list, wherein 1) the next sequence of tokens contains no recursive delimiters and is bounded by an opening and closing recursive delimiter, and 2) the repeating continues until only a single token remains in the main token list; and
generating, by the processor, the full syntax tree using the completed partial syntax tree of each respective sequence of tokens, wherein the single token remaining in the main token list is used as the head or the full syntax tree.

2. The method of claim 1, step 1 further comprises using a table of recursive delimiters to identify the first sequence of tokens, the opening recursive delimiter and a closing recursive delimiter forming either a matching pair, or at least one being an open only or closing only recursive delimiter.

3. The table of recursive delimiters of claim 2, where each entry in the table consists of the recursive delimiter(s), the delimiters being the opening and closing delimiters of a matching pair of delimiters, or just a single open only or closing only recursive delimiter, an indicator of whether the delimiter(s) should be included in the first sequence of tokens, and a token type to be used for an error token.

4. The method of claim 1, step 1 further comprising optionally including a delimiter in the first sequence of tokens if the delimiter is one of an open only recursive delimiter or a closing only recursive delimiter, and optionally including the delimiters in the first sequence of tokens if the delimiters form a recursive pair of delimiters.

5. The method of claim 1, further comprising indicating, by the processor, that a token of the main token list is unprocessed when it has not been used to identify a first sequence of tokens, and indicating, by the processor, that a token of the main token list is processed after it has be used to identify a first sequence of tokens.

6. The method of claim 1, step 2 further comprising prescanning, by the processor, the first sequence of tokens to determine the rules from the rule list that have a possibility of matching the tokens within the first sequence of tokens, and filtering, by the processor, the rule list based on the results of the prescanning.

7. The method of claim 1, the replacing further comprising: the error token type being selected from an entry in a recursive delimiter table used to identify the first sequence of tokens.

8. The method of claim 7, further comprising indicating, by the processor, that a token of the main token list is an error substitution token when step 2 causes an error token to be created.

9. The method of claim 7, wherein the error token associated with an entry in the recursive delimiter table is the same as a substitute token for the entry.

10. The method of claim 1, wherein the rules in the rule list, the rules list corresponding to the grammar of a programming language, are ordered by priority.

11. A computer program product comprising computer-readable program code to be executed by one or more processors when retrieved from a non-transitory computer-readable medium that is both grammar driven and non-recursive and that allows the use of regular expressions to define the grammar of a recursive programming language, the program code including instructions to:
   receive a text file containing information to be parsed;
   tokenize the information to be parsed within the text file to generate a plurality of tokens;
   organize the plurality of tokens into a main token list containing some tokens that represent recursive delimiters;
   perform the steps of:
      step 1: identify a first sequence of tokens in the main token list, the first sequence of tokens identified by locating a sequence of tokens bounded by an opening and closing recursive delimiter, the sequence containing no recursive delimiters; and
      step 2: generate a partial syntax tree from the first sequence of tokens, the generating comprising:
         applying each rule in a rule list to the first sequence of tokens, the rule list being a list of rules which defines the grammar of a recursive programming language, each rule comprising a regular expression and an associated replacement token, the applying comprising the steps of:
            finding a sub-sequence of tokens within the first sequence of tokens that matches the regular expression of the rule in the rule list;
            creating a portion of the partial syntax tree corresponding to the found sub-sequence of tokens, the portion of the partial syntax tree comprising the replacement token associated with the rule as the head of the portion of the partial syntax tree and the found sub-sequence of tokens as the children of the replacement token, inserting the portion of the partial syntax tree in place of the sub-sequence of tokens, wherein the head of the portion of the partial syntax tree is located at the previous location of the sub-sequence of tokens;

repeating the applying of the rule until all occurrences of the regular expression in the first sequence of tokens are found; and continuing the applying with the next rule in the rule list until all the rules in the rule list have been applied and the partial syntax tree is complete;

replacing the first sequence of tokens in the main token list with the completed partial syntax tree which resulted from applying the rules in the rule list if the first sequence of tokens contains only one remaining token, or if more than one token remains in the first sequence of tokens after applying the rules in the rule list: creatin an error token as a head of a new partial syntax tree, making the tokens remaining in the first sequence of tokens the children of said error token and replace the first sequence of tokens in the main token list with said new partial syntax tree;

marking the opening and closing delimiters as processed, wherein the marking transforms the recursive delimiters into a non-recursive state; and repeating step 1 and step 2 for a next sequence of tokens in the main token list, wherein 1) the next sequence of tokens contains no recursive delimiters and is bounded by an opening and closing recursive delimiter, and 2) the repeating continues until only a single token remains in the main token list; and generating the full syntax tree using the completed partial syntax tree of each respective sequence of tokens, wherein the single token remaining in the main token list is used as the head of the full syntax tree.

12. The computer program product of claim 11, step 1 further to use a table of recursive delimiters to identify the first sequence of tokens, the opening recursive delimiter and the closing recursive delimiter forming either a matching pair, or one at least being an open only or closing only recursive delimiter.

13. The table of recursive delimiters of claim 12 where each entry in the table consists of the recursive delimiter(s), the delimiters being the opening and closing delimiters of a matching pair of delimiters, or just a single open only or closing only recursive delimiter, an indicator or whether the delimiter(s) should be included in the first sequence of tokens, and a token type to be used for an error token.

14. The computer program product of claim 11, step 1 further to identify a first sequence of tokens including instructions to optionally include a delimiter in the first sequence of tokens if the delimiter is one of an open only delimiter or a closing only delimiter, and optionally include the delimiters from the first sequence of tokens if the delimiters form a recursive pair of delimiters.

15. The computer program product of claim 11, further comprising instructions to indicate that a token of the main token list is unprocessed when it has not been used to identify a first sequence of tokens, and indicate that a token of the main token list is processed after it has be used to identify a first sequence of tokens.

16. The computer program product of claim 11, the program code to generate a partial syntax tree from the first sequence of tokens further including instructions to prescan the first sequence of tokens to determine the rules from the rule list that have a possibility of matching the tokens within the first sequence of tokens, and filter the rule list based on the results of the prescanning.

17. The computer program product of claim 11, the program code to replace the first sequence of tokens further including instructions to:

select the error token type from an entry in a recursive delimiter table used to identify the first sequence of tokens.

18. The computer program product of claim 17, further comprising instructions to indicate that a token or the main token list is an error substitution token when step 2 causes an error token to be created.

19. The computer program product of claim 17, wherein the error token associated with an entry in the recursive delimiter table is the same as a substitute token for the entry.

20. The computer program product of claim 11, wherein the rules in the rule list, the rules list corresponding to the grammar of a programming language, are ordered by priority.

* * * * *